March 3, 1936.　　　　J. O. LEWIS　　　　2,032,623

VALVE

Filed March 20, 1933　　　2 Sheets-Sheet 1

INVENTOR.
James O. Lewis
By 
ATTORNEY.

March 3, 1936.                J. O. LEWIS                2,032,623
                                VALVE
                      Filed March 20, 1933      2 Sheets-Sheet 2

INVENTOR.
James O. Lewis
BY
ATTORNEY.

Patented Mar. 3, 1936

2,032,623

UNITED STATES PATENT OFFICE 2,032,623

VALVE

James O. Lewis, Tulsa, Okla.

Application March 20, 1933, Serial No. 661,699

5 Claims. (Cl. 251—113)

My invention relates to valves and more particularly to valves for use in lines through which fluid is conducted under high pressure.

A valve of this character requires close seating to prevent leakage of fluid around its core, plug or plate, and pressure of fluid in the line tends to lock the closure member against the down-stream seat so that considerable force is required for its operation and there is a greater tendency to wear the seating faces than is experienced with valves of other types.

It is the object of my invention to provide a valve adaptable for use in high pressure lines by which tight seating may be effected to provide the required sealing contacts, but which may be relieved when the closure member is to be shifted within its range of movement.

In accomplishing this and other objects of the invention I have provided improved details of structure, the preferred form of which is illustrated in the accompanying drawings, wherein.

Figure 1:
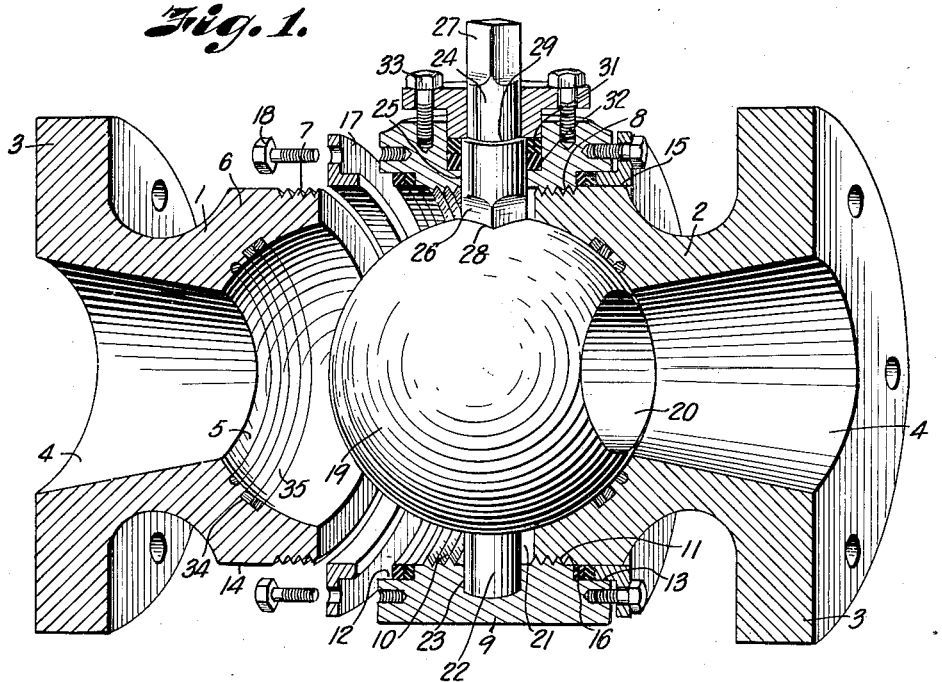
Fig. 1 is a perspective view of a valve embodying my invention, showing the housing in central longitudinal section with one of the housing members and its associated parts in spaced relation, and the core in open position.
Figure 2:
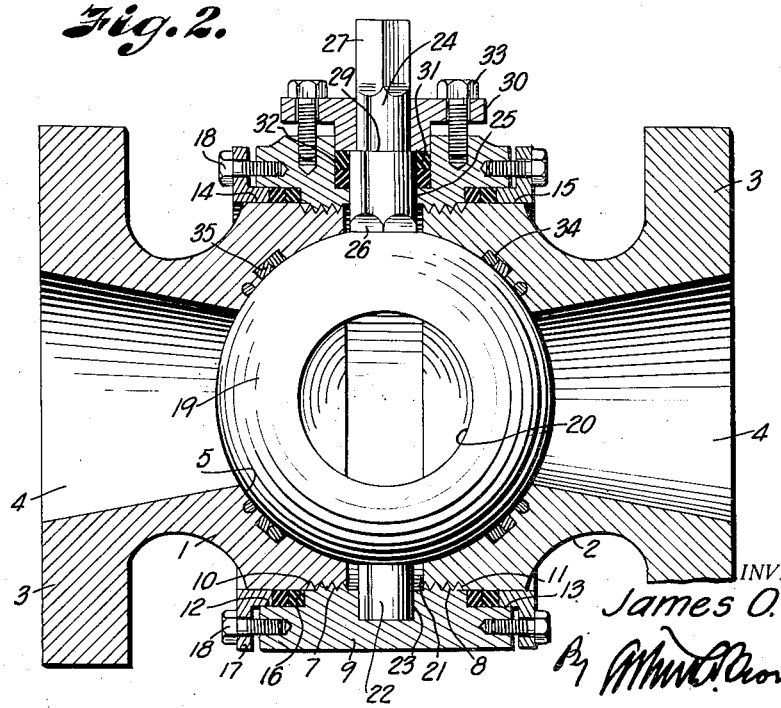
Fig. 2 is a central longitudinal section of the valve showing the core in closed position.
Figure 2:
Figure 3:
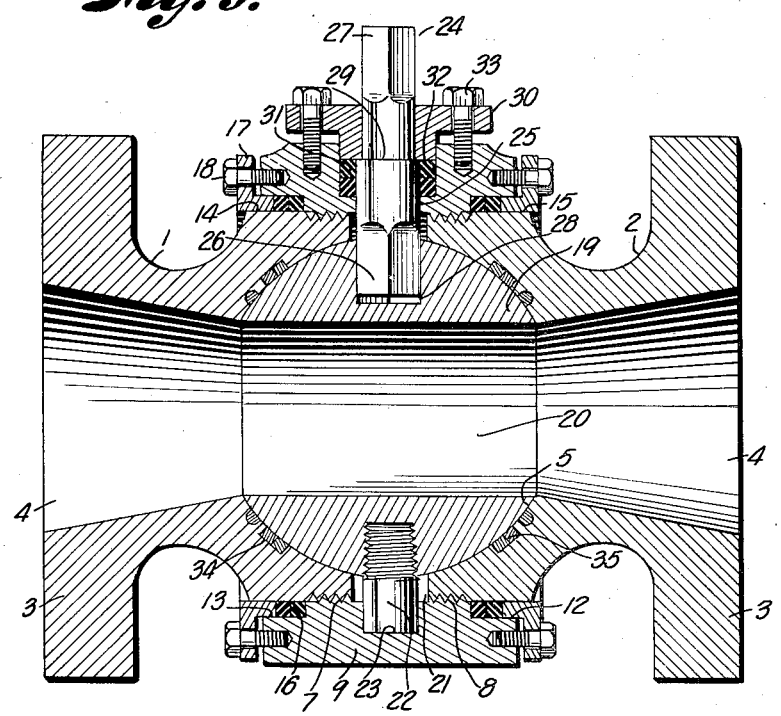
Fig. 3 is a central longitudinal section of both the housing and core elements of the valve showing the core in open position and particularly illustrating the core centering and actuating members.
Figure 4:
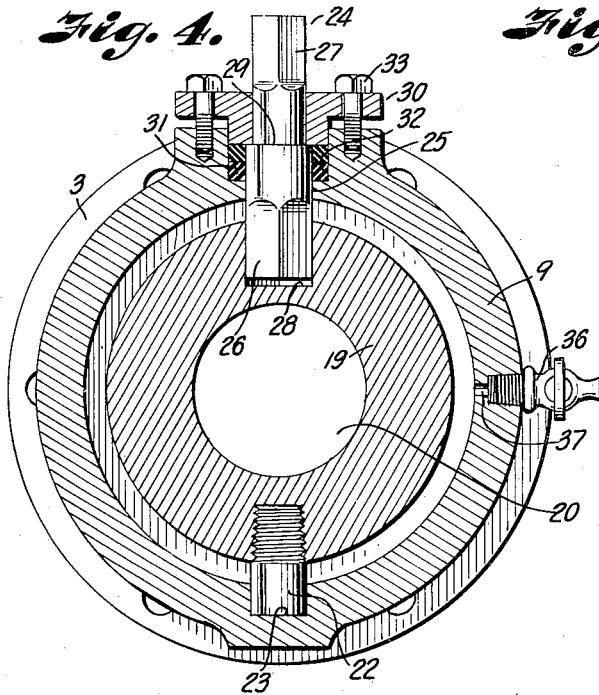
Fig. 4 is a central transverse section of the valve showing the core in open position and particularly illustrating a bleeding cock for relieving pressure on the core actuator when the latter is to be re-packed.
Figure 5:
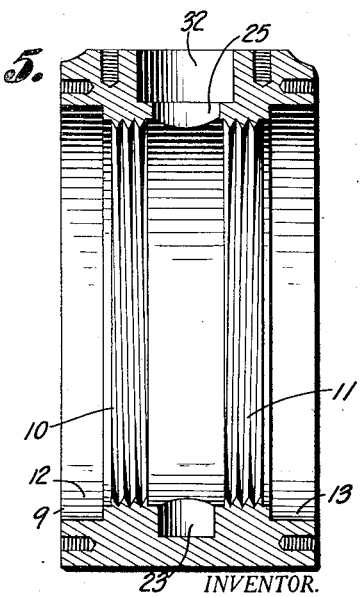
Fig. 5 is a central section of the coupling for the split housing members particularly illustrating the right and left hand thread connectors.

Referring more in detail to the drawings:

1 and 2 designate separate housing members, each having the usual flange 3 for connecting the valve in a pipe line in accordance with ordinary practice and having tapered throats 4 opening to concave seats 5 for a spherical core, presently described.

The necks 6 have right and left hand screw threads 7 and 8, respectively, for mounting a coupling ring 9 having interiorly threaded sections 10 and 11 cooperating with the threaded necks of the housing members to simultaneously draw the housing members toward each other or spread them apart, according to direction of rotation of the ring when the parts are assembled, the ring 9 being undercut along its edges outwardly of its threaded sections 10 and 11 to form grooves 12 and 13 between the undercut faces on the ring and mating faces 14 and 15 on the necks of the housing members for receiving packing 16 that is held in the grooves by glands 17 attached to the ring by the stud bolts 18.

19 designates a spherical core adapted to fit the seats 5 in the housing members and having a through-port 20 adapted for registration with the tapered throats 4 when the core is in fully open position, the necks 6 of the housing members being of a length to provide an intervening space 21 between their ends when the core is seated in the respective housing members. The core is preferably mounted in the ring 9 by means of a centering pin 22 rotatably mounted in a socket 23, opening to the interior of the ring and an oppositely extending coaxial wrench pin 24 rotatably mounted in a bearing aperture 25 in the ring and provided with wrench heads 26 and 27 at its opposite ends adapted, respectively, for fitting in a squared socket 28 in the core and for application of a wrench exteriorly of the housing. The pin 24 is preferably reduced in diameter to provide a shoulder 29 for engagement by the gland 30, whereby packing 31 for the wrench pin is retained in a socket 32 in the ring, the gland being attached to the ring by stud bolts 33 in accordance with common practice.

To insure against leakage around the core I provide the seats 5 with grooves 34 containing packing rings 35 of metal or other suitable material, and for relieving the space 21 between the housing necks I provide a bleeding cock 36 which communicates with said space through a port 37 in the ring 9.

The parts of the valve constructed as described are assembled by threading the centering pin 22 into the valve core, seating the pin in its socket in the coupling ring and threading the coupling ring onto the necks of the housing members until the seats 5 fit snugly against the core. The wrench pin is then inserted through its opening in the ring into the squared opening of the core opposite the centering pin and the packing pressed to place by the respective glands. While the centering pin is not an essential of the invention, I prefer to include it to facilitate assembly of the valve parts and for its utility in cooperating with the wrench pin to relieve pressure on the downstream side of the valve when the valve is in use.

The valve is then interposed between sections of a flow line to regulate flow through the line.

When fluid in the line is under high pressure there is a tendency to bind the core so that it is difficult to adjust but, with my improved construction this difficulty is averted by spreading of the housing members by rotation of the coupling ring, it being apparent that, when the ring is turned in one direction the right and left hand threads on opposite sides of the ring will simultaneously move the housing members apart or draw them together, to relieve the core from pressure in one instance, and tighten the seats against the core to insure against leakage in the other instance, and that this actuation of the housing members may be effected regardless of the position of the core in the flow line channel.

It is further apparent that but a slight movement of the ring and corresponding shift of the housing members is required to either spread the seats when the core is to be turned or draw the seats together when effective sealing of the core is desired. It is further apparent that actuation of the ring may be effected by application of a suitable tool, such as an extension rod, to the outer end of the wrench pin 24.

It is also apparent that spreading of the housing members to permit turning of the valve core will not loosen the packing between the housing members and coupling ring as said members will merely move over the ring without affecting compression thereof, but that any wear of the packing may be taken up by the gland stud bolts in accordance with common practice.

It is also apparent that when the seats are clamped against the core when it is in shut off position the tightness of shut off can be tested by the bleeding cock, and that when it is desired to assure against co-mingling of fluids on the two sides of the valve, this can be done by leaving the bleeding cock open, thus draining the valve of any fluid that might leak by either seat, and thus prevent possibility of its leakage past the other seat.

When the wrench pin packing is being renewed, leakage about the core is prevented by the packing rings 35 so that pressure in the channel 21 can be relieved through the bleeding cock, and thereby prevent blow-out of the pin which might result in injury to workmen.

What I claim and desire to secure by Letters Patent is:

1. A valve including housing members having cylindrical mating neck portions provided with facing valve seats joined to the respective members, a valve core positioned between said members and normally engaged by said seats, a coupling ring having right and left threaded connection with the respective cylindrical neck portions and rotatable thereon to shift simultaneously said members including said seats to and from the valve core, packing between the housing members and ring, and packing glands engaging the packing for retaining the packing in constant degree of compression throughout the range of movement of said valve core.

2. A valve including housing members having cylindrical mating neck portions provided with facing valve seats joined to the respective members, a valve core positioned between said members and normally engaged by said seats, a coupling ring having right and left threaded connections with the respective cylindrical neck portions and provided with annular packing grooves, packing in said grooves, packing glands fixed to said ring and slidable freely over the cylindrical neck portions of the housing members in the longitudinal direction of said threaded connections to retain said packing in compression throughout the range of movement of said seats away from the valve core.

3. A valve including a transversely divided housing having spherically concaved valve seats joined to its respective members and provided with annular packing grooves in said spherical seat portions, a spherical core positioned between said members and normally engaged by said spherically concaved seats, a coupling ring having right and left threaded connections with the respective housing members for moving the housing members including said seats to and from the spherical core, a valve stem rotatable in the coupling ring for operating the spherical core, and packing elements in said grooves sealingly engaging the spherical core for retarding leakage between said seats and the core when the seats are moved away from the core.

4. A valve including a transversely divided housing having spherically concaved valve seats joined to its respective members and provided with annular packing grooves in said spherical seat portions, a spherical core positioned between said members and normally engaged by said spherical seats, a coupling ring having right and left threaded connections with the respective housing members for moving the housing members including said seats to and from the spherical core, a valve stem rotatable in the coupling ring for operating the spherical core, packing elements in said grooves sealingly engaging the spherical core for retarding leakage between said seats and the core when the seats are moved away from the core, and means for sealing the joints between the coupling ring and said housing members for preventing leakage of fluid passing the packing elements.

5. A valve including a ring section having sets of right and left threads, a valve core, means mounting the valve core for movement in the ring section, end sections having sets of threads respectively interengaged with the sets of threads on the ring section whereby the end sections are moved to and from the valve core upon rotation of the ring section, packing between the ring section and the end sections to seal the joints between said interengaged threads, packing glands compressing the packing and having fixed relation with one of the threads of the interengaged sets and relative longitudinal movement with respect to the other threads of the sets during rotation of the ring section whereby the packing is kept in the same degree of compression during adjustment of the end sections relatively to the valve core.

JAMES O. LEWIS.